(12) United States Patent
Kwon et al.

(10) Patent No.: US 6,731,572 B2
(45) Date of Patent: May 4, 2004

(54) OPTICAL PICKUP ACTUATOR, OPTICAL PICKUP EMPLOYING THE OPTICAL PICKUP ACTUATOR, AND OPTICAL RECORDING AND/OR REPRODUCING APPARATUS EMPLOYING THE OPTICAL PICKUP

(75) Inventors: Myung-sik Kwon, Suwon-si (KR); Jung-gug Pae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/324,113

(22) Filed: Dec. 20, 2002

(65) Prior Publication Data

US 2003/0133373 A1 Jul. 17, 2003

Related U.S. Application Data

(63) Continuation-in-part of application No. 10/022,836, filed on Dec. 20, 2001.

(30) Foreign Application Priority Data

Apr. 12, 2001 (KR) .......................................... 2001-19568
Feb. 20, 2002 (KR) .......................................... 2002-9097

(51) Int. Cl.[7] ................................................ G11B 7/00
(52) U.S. Cl. .................................................... 369/44.16
(58) Field of Search ........................... 369/44.14, 44.15, 369/44.32, 44.16

(56) References Cited

U.S. PATENT DOCUMENTS 6,496,451 B2 * 12/2002 Kimura et al. ........... 369/44.15

* cited by examiner

Primary Examiner—Nabil Hindi
(74) Attorney, Agent, or Firm—Staas & Halsey LLP (57) ABSTRACT

An optical pickup actuator which can compensate for a curvature of a disc, an optical pickup employing the optical pickup actuator, and an optical recording/reproducing apparatus employing the optical pickup. The optical pickup actuator includes a base having a holder, a bobbin mounting an objective lens, a plurality of elastic supports having one end coupled to the holder and another end coupled to the bobbin such that the bobbin is movably supported, and a magnetic driving portion which drives the bobbin in a focusing direction and for a tracking direction. The plurality of elastic supports includes inner elastic supports that are positioned on a side of the optical pickup actuator closest to a center of the disc and outer elastic supports that are positioned on an opposite side of the optical pickup actuator closest to an outer perimeter of the disc, and the inner elastic supports and outer elastic supports have different lengths.

33 Claims, 10 Drawing Sheets

OPTICAL PICKUP ACTUATOR, OPTICAL PICKUP EMPLOYING THE OPTICAL PICKUP ACTUATOR, AND OPTICAL RECORDING AND/OR REPRODUCING APPARATUS EMPLOYING THE OPTICAL PICKUP

CROSS REFERENCE TO RELATED APPLICATIONS

This application is a continuation-in-part of U.S. patent application Ser. No. 10/022,836, filed on Dec. 20, 2001, in the United States Patent and Trademark Office, the disclosure of which is incorporated herein by reference.

This application claims the priority of Korean Patent Application No. 2002-9097, filed on Feb. 20, 2002 and Korean Patent Application No. 2001-19568, filed Apr. 12, 2001, in the Korean Intellectual Property Office, the disclosures of which are incorporated herein by reference.

BACKGROUND OF THE INVENTION

1. Field of the Invention

The present invention relates to an actuator of an optical pickup used to record information on and/or to reproduce information from a disc, and more particularly, to an optical pickup actuator that compensates for deflection error caused by curvature of a disc, an optical pickup employing the optical pickup actuator, and an optical recording/reproducing apparatus employing the optical pickup.

2. Description of the Related Art

In general, optical pickups are embedded in optical recording/reproducing apparatuses to record information on and/or to reproduce information from optical recording media, such as discs. Optical pickups record and/or reproduce information by radiating a light beam onto a recording surface of a disc and receiving a light beam reflected back from the recording surface while moving radially around the disc.

Figure 1:
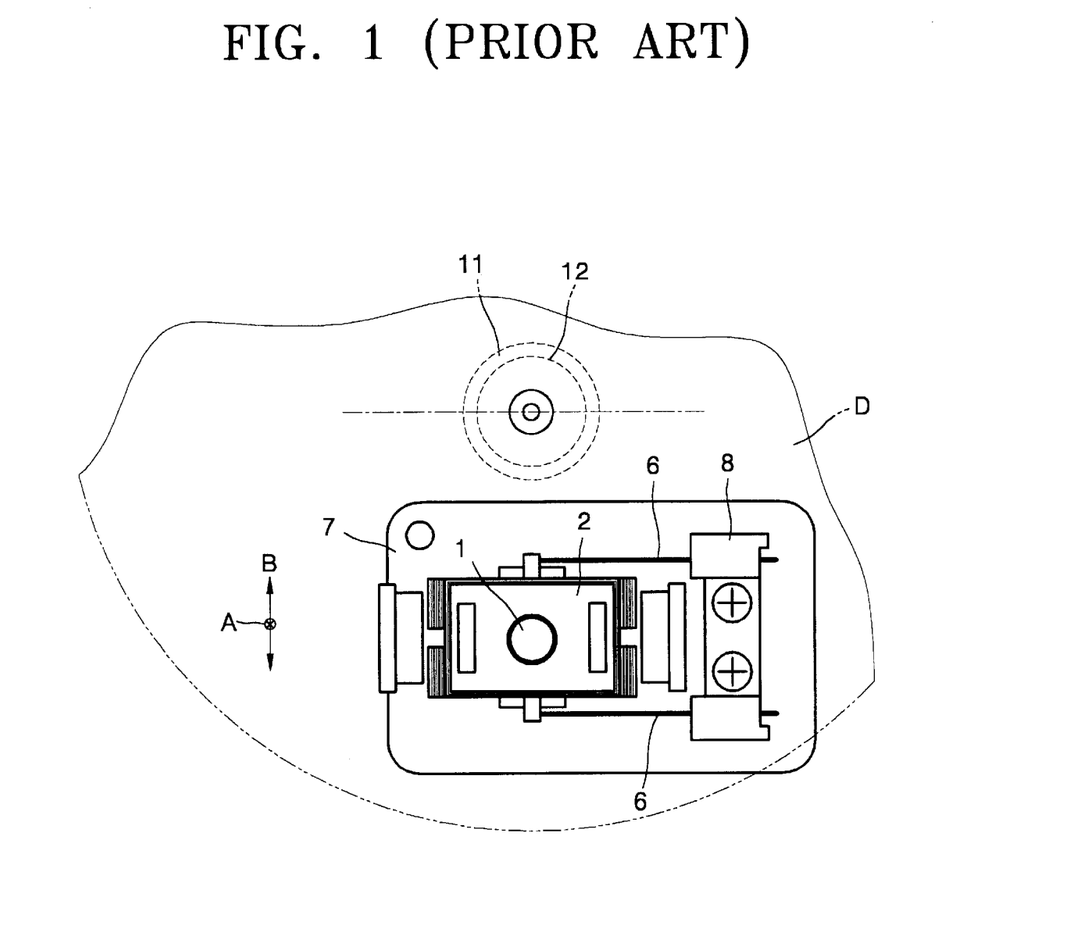
FIG. 1 is a plan view of a conventional optical pickup actuator.
Figure 2:
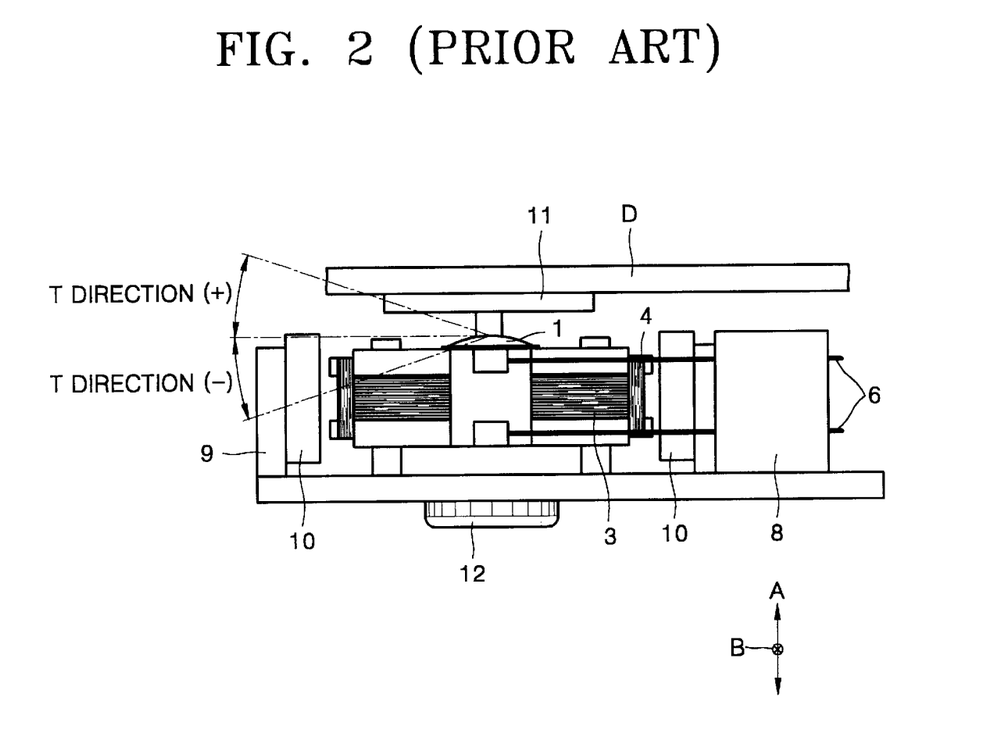
FIG. 2 is a front view of the optical pickup actuator shown in FIG. 1.
Figure 3:
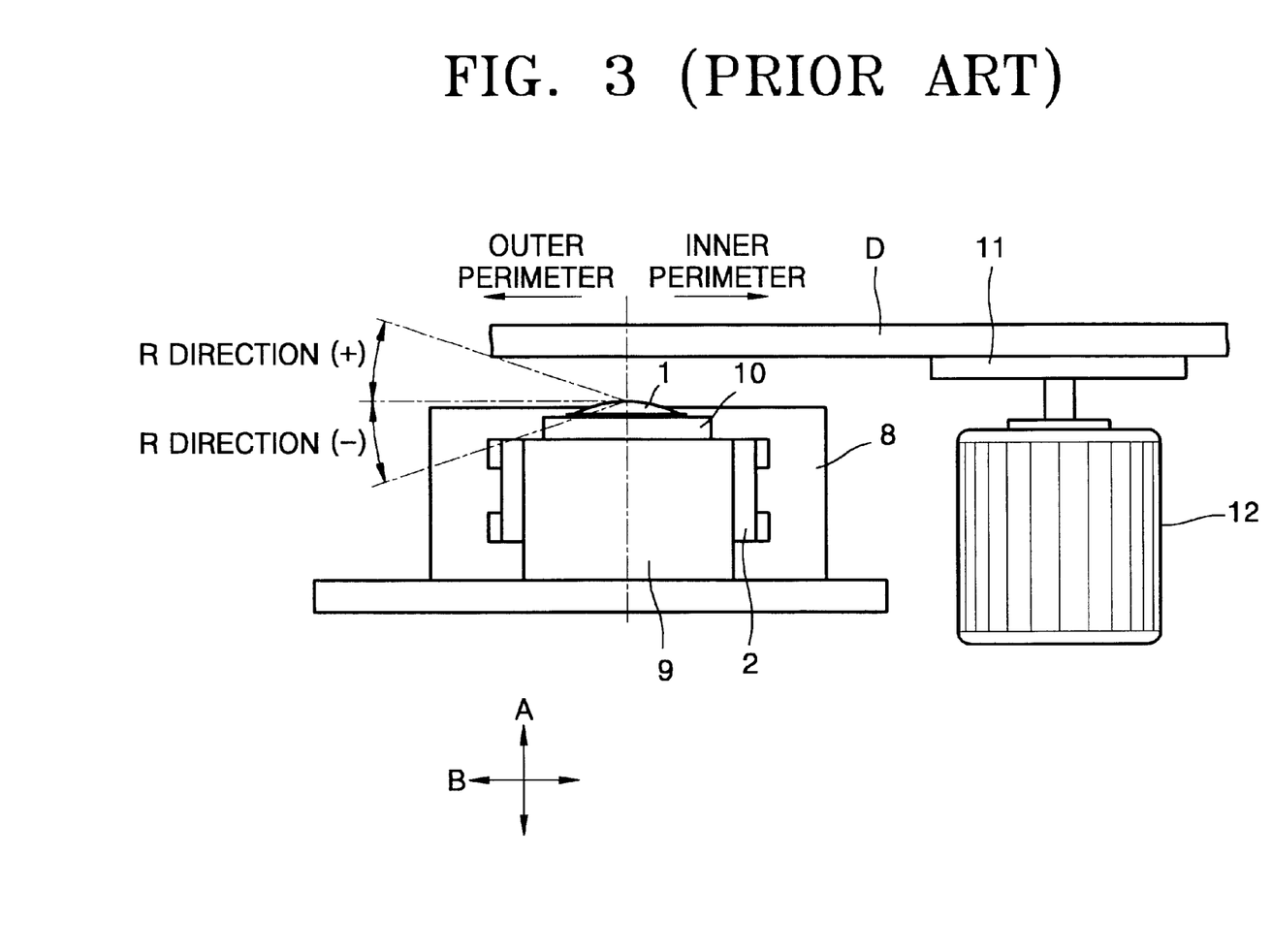
FIG. 3 is a cross-sectional view of the optical pickup actuator shown in FIG. 1.

FIGS. 1 through 3 are views of an optical pickup actuator included in an optical pickup. The optical pickup actuator includes a base 7, a holder 8 fixed on the base 7, a bobbin 2 moveably supported by elastic supports 6 having one end fixed to the holder 8 and on which an objective lens 1 is mounted, a focusing coil 3 and tracking coils 4, respectively, mounted on the bobbin 2 so as to form paths through which currents flow to drive the objective lens 1 in a focusing direction A and/or a tracking direction B, and a magnet 10 which generates a magnetic field that interacts with respective currents flowing through the focusing coil 3 and tracking coils 4 to produce an electromagnetic force used to drive the bobbin 2, and a yoke 9.

The optical pickup actuator having the above-mentioned structure is disposed opposite to a disc D, and moves radially around the disc D, recording information on and/or reproducing information from the disc D. Reference numerals 11 and 12 denote a turntable on which the disc D is seated, and a motor to turn the turntable, respectively.

In the above-mentioned structure, if a current is supplied to the focusing coil 3, the bobbin 2 is driven in the focusing direction A by an electromagnetic force generated by an interaction of the supplied current and the magnetic field of the magnet 10. In this case, a vertical focusing direction is determined according to a direction of the current supplied to the focusing coil 3. Thus, a focal distance between the recording surface of the disc D and the objective lens 1 is controllable by adjusting an amount of the current flowing through the focusing coil 3. In a similar way, the bobbin 2 is drivable in the tracking direction B by an electromagnetic force generated by an interaction of a supplied current and the magnetic field of the magnet 10. By controlling an amount of current flowing through the tracking coils 4 the objective lens 1 is enabled to accurately follow a desired track on the disc D.

The recording surface of the disc D should be formed to be level. However, the disc D is usually slightly curved upward or downward. The curvature of the disc D creates a kind of focusing error when the disc D is operated with the optical pickup actuator. In particular, when the disc D exhibiting the curvature rotates on the turntable 11, the focal distance between the objective lens 1 of the optical pickup actuator and the disc D varies by an amount corresponding to a displacement of the disc surface from a flat plane due to the curvature thereof. To compensate for a variation due to the curvature of the disc, the optical pickup actuator performs a focus control.

Further, since the bobbin 2 moves in an arc by hanging on one end of the elastic supports 6, due to an error in a manufacturing process or a problem with the structure of the optical pickup actuator, the bobbin 2 does not accurately move in either of a vertical direction or horizontal direction during respective focusing and tracking operations. Instead, the bobbin 2 exhibits a rolling phenomenon in which the bobbin 2 tilts to one side or tilts either backward or forward. The rolling phenomenon includes a tangential direction rolling in which the bobbin 2 tilts about an axis parallel to the a radius vector of the disc D at a position of the bobbin 2, as shown in FIG. 2, and a radial direction rolling in which the bobbin 2 tilts about an axis parallel to the tangent of the disc D at a position of the bobbin 2, as shown in FIG. 3. Tilting of the bobbin 2 toward a center of the disc D is referred to as (+) rolling, and tilting of the bobbin 2 toward an outer perimeter of the disk D is referred to as (−) rolling.

SUMMARY OF THE INVENTION

It is an aspect of the present invention to provide an optical pickup actuator which can control rolling in a radial direction so as to compensate for curvature of a disc during a focusing operation, an optical pickup employing the optical pickup actuator, and an optical recording/reproducing apparatus employing the optical pickup.

Additional aspects and advantages of the invention will be set forth in part in the description which follows and, in part, will be obvious from the description, or may be learned by practice of the invention.

Accordingly, to achieve the above and or other aspects, there is provided an optical pickup actuator. The actuator includes a base having a holder, a bobbin mounting an objective lens, a plurality of elastic supports having one end coupled to the holder and another end coupled to the bobbin such that the bobbin is movably supported, and a magnetic driving portion which drives the bobbin in a focusing direction and/or a tracking direction. The plurality of elastic supports comprises inner elastic supports that are positioned on a side of the optical pickup actuator closest to a center of a disc and outer elastic supports that are positioned on an opposite side of the optical pickup actuator closest to an outer perimeter of the disc, and the inner elastic supports and outer elastic supports have different lengths.

The outer elastic supports are longer than the inner elastic supports.

The difference in a length between the outer elastic supports and the inner elastic supports is greater than 0 and less than 3 mm.

To achieve the above and/or other aspects, there is provided an optical pickup including an optical system having an objective lens and a optical pickup actuator, the pickup actuator being provided to control focusing and tracking servos of the objective lens to record information on and/or to reproduce information from a disc. The optical pickup actuator includes a base having a holder, a bobbin mounting the objective lens, a plurality of elastic supports having one end coupled to the holder and another end coupled to the bobbin such that the bobbin is movably supported, the plurality of elastic supports including inner elastic supports that are positioned on a side of the optical pickup actuator closest to center of the disc and outer elastic supports that are positioned on an opposite side of the optical pickup actuator closest to an outer perimeter of the disc, the inner elastic supports and outer elastic supports having different lengths, and a magnetic driving portion which drives the bobbin in a focusing direction and/or a tracking direction.

To achieve the above and/or other aspects, there is provided an optical recording/reproducing apparatus comprising a spindle motor which rotates a disc, an optical pickup which is movably disposed in a radial direction of the disc by a pickup actuator, a driving portion which drives the spindle motor and the optical pickup, and a controlling portion which controls focusing and tracking servos of the optical pickup. The pickup actuator includes a base having a holder, a bobbin mounting an objective lens, a plurality of elastic supports having one end coupled to the holder and another end coupled to the bobbin such that the bobbin is movably supported, the plurality of elastic supports including inner elastic supports that are positioned on a side of the optical pickup actuator closest to a center of the disc and outer elastic supports that are positioned on an opposite side of the pickup actuator closest to an outer perimeter of the disc, the inner elastic supports and outer elastic supports having different lengths, and a magnetic driving portion which drives the bobbin in a focusing direction and/or a tracking direction.

BRIEF DESCRIPTION OF THE DRAWINGS

These and other aspects and/or advantages of the invention will become apparent and more readily appreciated from the following description of the preferred embodiments, taken in conjunction with the accompanying drawings of which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4A:
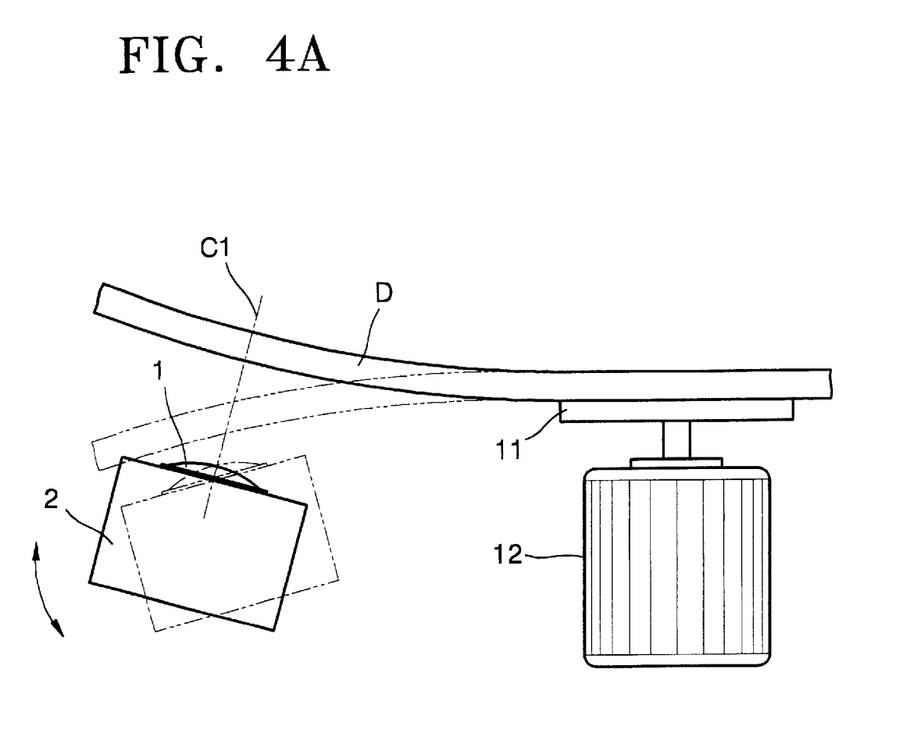
FIGS. 4A through 4C illustrate effects of radial rolling during a focusing operation.
Figure 4B:
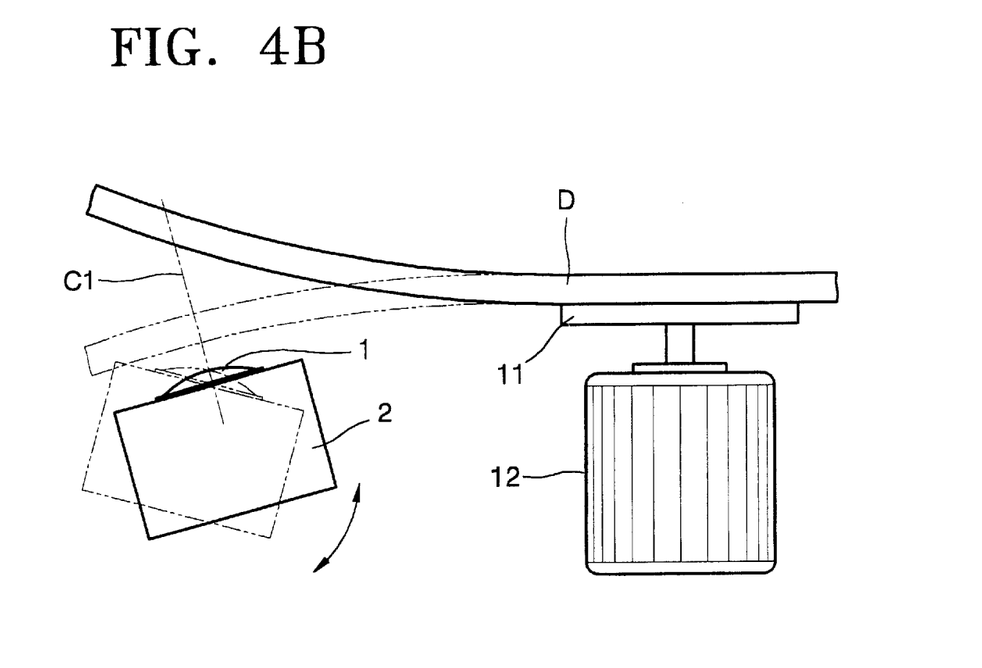
Figure 4C:
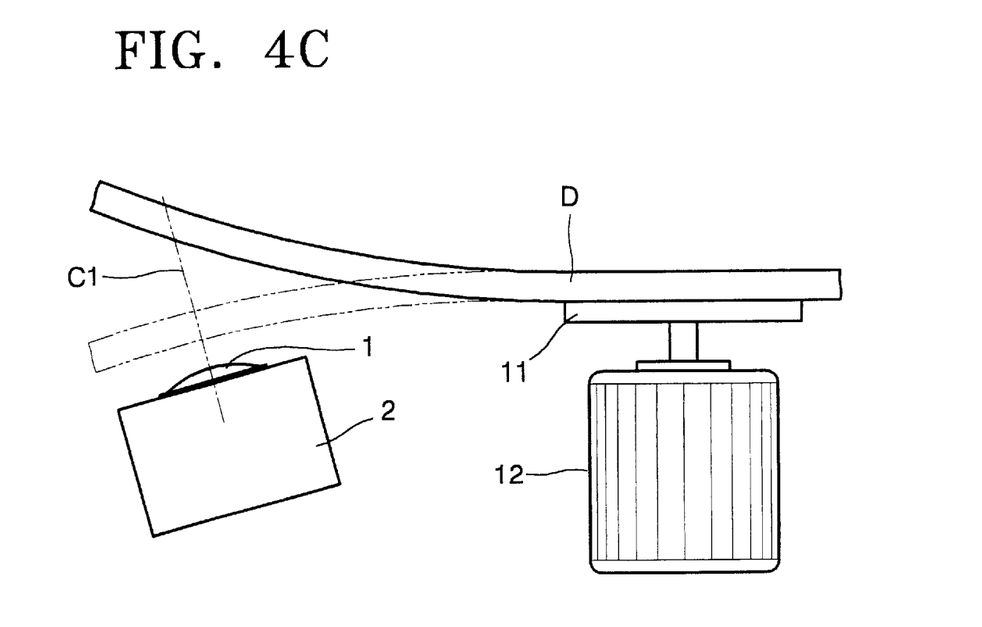

FIGS. 4A–4C show three types of radial direction rolling. FIG. 4A shows a first type of radial direction rolling herein referred to as type A radial rolling. When the bobbin 2 moves upward, that is, when the objective lens 1 approaches the disc D, the type A radial rolling is in a (+) direction, and, conversely, when the bobbin 2 moves downward, the type A radial rolling is in a (−) direction. FIG. 4B shows a second type of radial direction rolling herein referred to as type B radial rolling. When the bobbin 2 approaches the disc D, the type B radial rolling is in the (−) direction, and when the bobbin 2 moves downward, the type B radial rolling is in the (+) direction. FIG. 4C shows a third type of radial direction rolling herein referred to as type C radial rolling. The rolling direction does not depend on whether the objective lens 1 ascends or descends. That is, whether the objective lens 1 approaches the disc D or is spaced apart from the disc D by a predetermined gap, rolling is in one of (+) and (−) directions.

After performing a focusing operation to adjust an orientation of the objective lens 1 for the disc D exhibiting curvature, if an optical axis C1 of the objective lens 1 is not perpendicular to the recording surface of the disc D, this is known as a deflection error. When performing the focusing operation, the type A radial rolling causes the optical axis C1 of the objective lens 1 to be almost perpendicular to the recording surface of the disc D. Thus, the type A radial rolling is effective in offsetting the defection error. On the contrary, the type B radial rolling causes the optical axis C1 of the objective lens 1 and the recording surface of the disc D to move even further from a perpendicular arrangement, thereby increasing the deflection error. Further, the type C radial rolling is effective only in one case in which the objective lens 1 moves upward or downward but is not effective in the other cases.

Considering the three types of radial rolling, to properly adjust the orientation of the objective lens 1 with respect to a disc D exhibiting curvature, the type A radial rolling is the most desirable, and the type C radial rolling is not desirable but is available. However, the type B radial rolling has a harmful effect on recording/reproducing performance, and thus to use type B is not desirable. However, in conventional optical pickup actuators, the three types A, B and C of radial rolling appear with almost equal frequencies due to various factors related to assembly tolerances in assembly of the actuators. To solve the above-mentioned problem without any special measures, when new optical pickup actuators are manufactured, the optical pickup actuators exhibiting the type B radial rolling are treated as defective, and only the optical pickup actuators having the types A and C radial rolling are used. However, treating newly manufactured optical pickup actuators exhibiting type B radial rolling as defective results in a low production efficiency and a high production overhead.

Accordingly, an optical pickup actuator which consistently exhibits the A type radial rolling increases a production efficiency and lowers production overhead.

Figure 5:
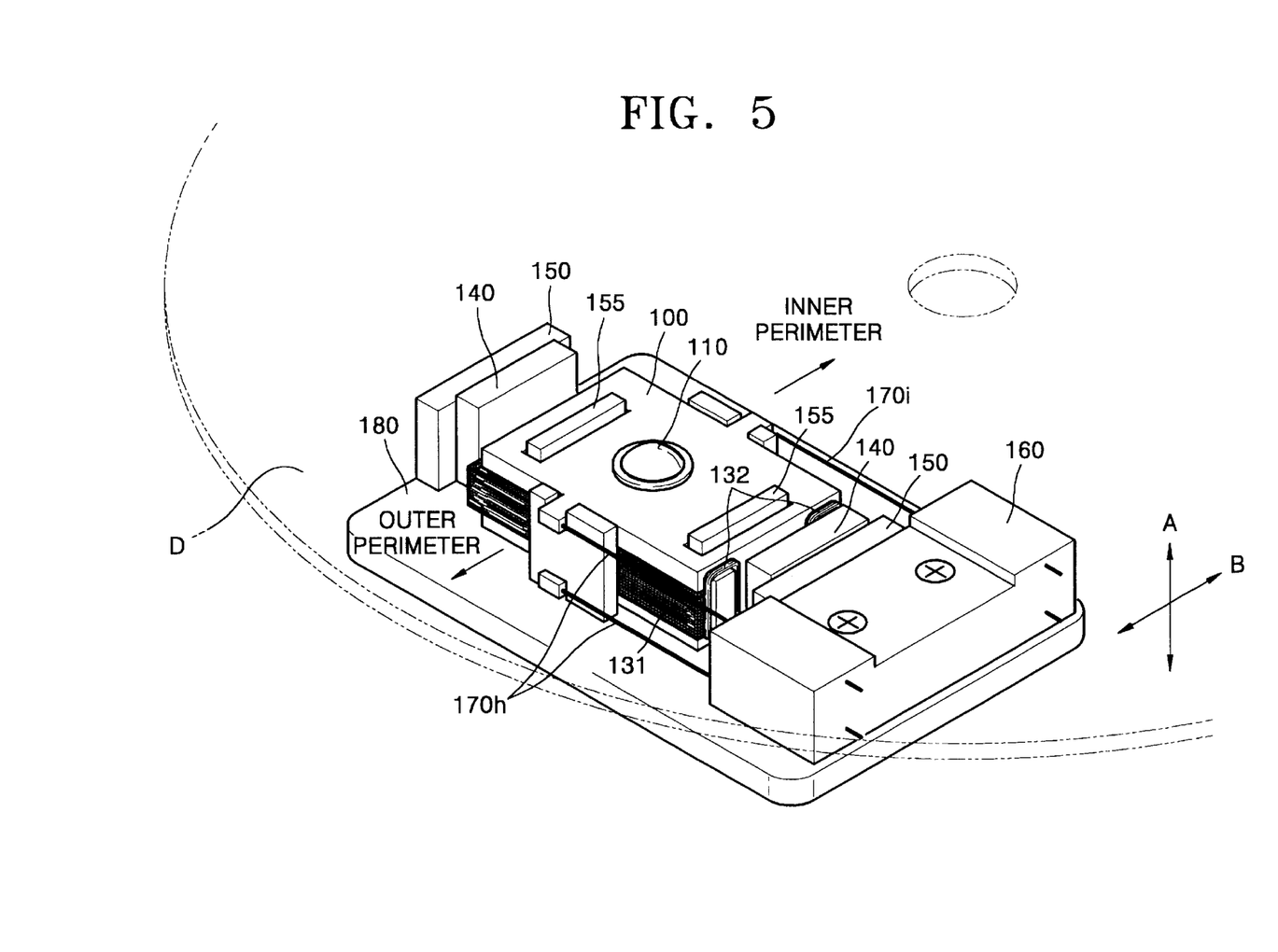
FIG. 5 shows an embodiment of an optical pickup actuator according to the present invention.

Referring to FIG. 5, an optical pickup actuator according to an embodiment of the present invention includes a base 180, a holder 160 positioned at one side of the base 180, a bobbin 100 on which an objective lens 110 is mounted, a plurality of elastic supports 170*i* and 170*h* connecting the bobbin 100 to the holder 160, and a magnetic driving portion which drives the bobbin 100 in a focusing direction A and/or a tracking direction B.

The magnetic driving portion includes first and second magnets 140 that are positioned opposite to each other with the bobbin 100 placed therebetween, an external yoke 150 which is installed on the base 180 and fixes each of the first and second magnets 140 in place, an internal yoke 155 which is installed on the base 180 between and opposite to the first and second magnets 140, each of the first and second magnets being positioned, respectively, between the external yoke 150 and the internal yoke 155 to guide the bobbin 100, a focusing coil 131 wound around an outside of the bobbin 100, and tracking coils 132 wound at sidewalls of the bobbin 100 opposite to the first and second magnets 140.

Figure 6:
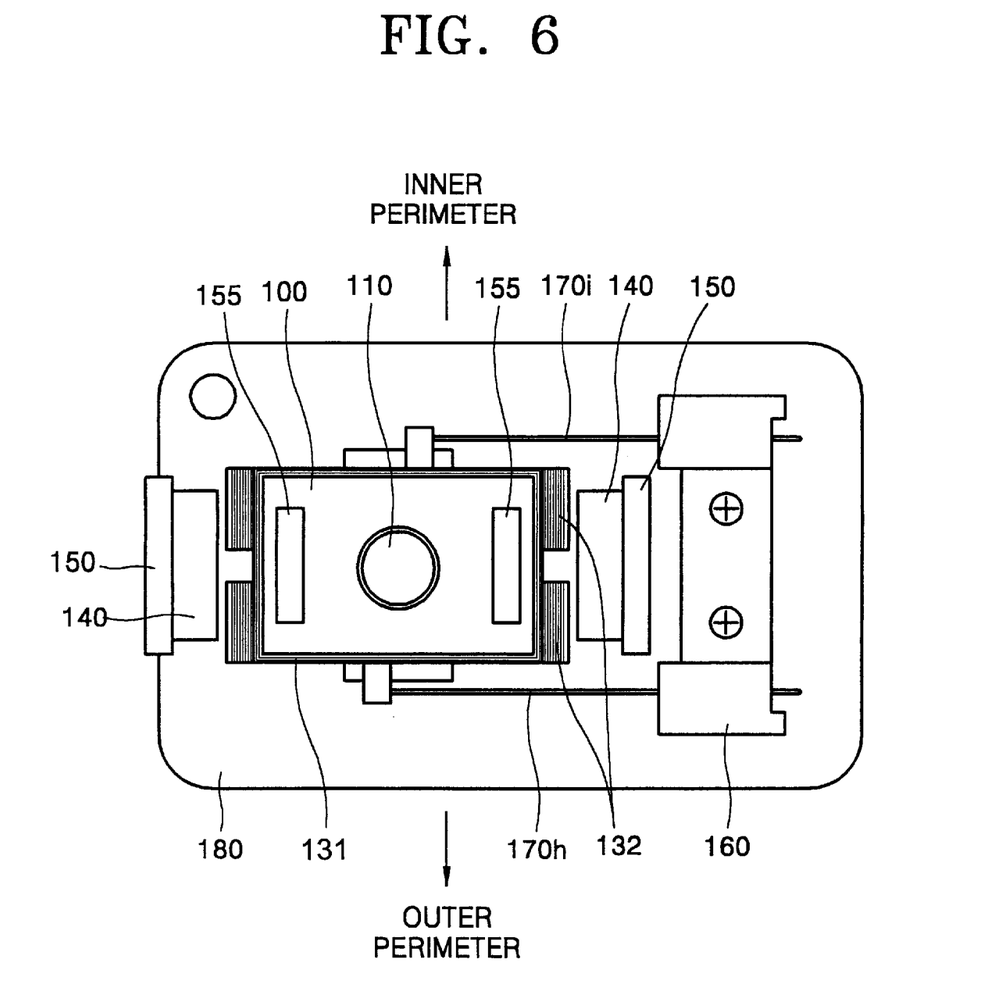
FIG. 6 is a plan view of the optical pickup actuator shown in FIG. 5.

The bobbin 100 is supported by the plurality of elastic supports 170*i* and 170*h* connected to the holder 160 such that the bobbin 100 is elastically movable. The elastic supports 170*i* are positioned at a side of the optical pickup actuator closest to a center of a disc D and are hereinafter referred to as inner elastic supports 170*i*. Further, the elastic supports 170*h* are positioned at a side of the optical pickup actuator furthest from the center of the disc D and are hereinafter referred to as outer elastic supports 170*h*. The stiffness of the inner elastic supports 170*i* is different from the stiffness of the outer elastic supports 170*h*. The difference in stiffness may be achieved, for example, by making at least one of a thickness, a length, and a material of the inner elastic supports 170*i* different from the outer elastic supports 170*h*. As shown in FIG. 6, which is a plan view of the optical pickup actuator shown in FIG. 5, the length of the inner elastic supports 170*i* may be different from the length of the outer elastic supports 170*h*. In particular, the outer elastic supports 170*h* may be longer than the inner elastic supports 170*i*. Furthermore, a difference in a length between the inner and outer elastic supports 170*i* and 170*h* may be in a range of greater than 0 and less than 3 mm. The range is optimal to compensate for a curvature of discs. If the difference in the length between the inner and outer elastic supports 170*i* and 170*h* is too large, an over compensation for a deflection error may occur.

The operation of the optical pickup actuator having the above-mentioned structure will now be described. If a current is applied to the focusing coil 131 or the tracking coils 132, the bobbin 100 is driven in a focusing direction A or a tracking direction B, respectively, by an electromagnetic force generated by an interaction of the current with the magnetic field of the first and second magnets 140. When the bobbin 100 is driven in the focusing direction A, a direction (e.g., the vertical movement direction) of the bobbin 100 is determined by a direction of current applied to the focusing coil 131. Likewise, when the bobbin 100 is driven in the tracking direction B a direction (e.g., the horizontal movement) of the bobbin 100 is determined by a direction of current applied to the tracking coils 132. Thus, the internal yoke 155 serves to guide the bobbin 100 during a focusing and/or tracking operation and simultaneously forms a magnetic path together with the external yoke 150. The focusing and/or tracking operations enable the bobbin 100 to be oriented such that a beam passing through the objective lens 110 is properly focused on the disc D, thereby enabling information to be recorded on and/or read from the disc D.

As described above, the bobbin 100 is movably supported by the elastic supports 170*i* and 170*h*, thereby enabling rolling of the bobbin 100 to be achieved during the focusing and/or tracking operations. Since the length of the outer elastic supports 170*h* is greater than that of the inner elastic supports 170*i*, the stiffness of the outer elastic supports 170*h* is less than that of the inner elastic supports 170*i*. Accordingly, an outer side of the optical pickup actuator, corresponding to an outer perimeter of the disc D, is deflected more than the inner side, corresponding to an inner perimeter of the disc D, during the focusing and/or tracking operations. That is, a displacement of the side of the bobbin 100 closer to the outer perimeter of the disc D is larger than a displacement of the opposite side of the bobbin closer to the center of the disc D. Accordingly, a deflection error of the disc D, in which a displacement of the surface of the disc D with respect to a flat plane increases as a distance from the center of the disc D increases, is compensated for by the larger deflection of the outer side of the optical pickup actuator.

In the embodiment, the stiffnesses of the inner and outer elastic supports 170*i* and 170*h* are different by making the lengths of the inner and outer elastic supports 170*i* and 170*h* different. However, alternative embodiments may be realized by making at least one of a thickness, a length, and a material of the inner elastic supports 170*i* different from the outer elastic supports 170*h*, thereby affecting the respective stiffnesses of the inner and outer elastic supports 170*i* and 170*h*. For example, the thickness of the inner elastic supports 170*i* may be greater than that of the outer elastic supports 170*i* and 170*h*.

Figure 7A:
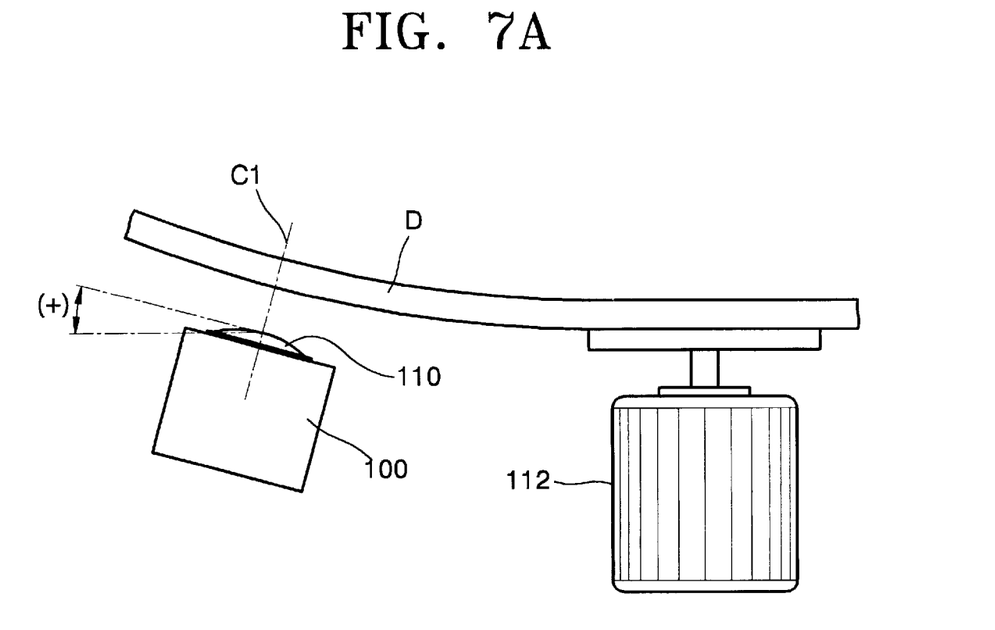
FIGS. 7A through 7C illustrate effects of the embodiment of the optical pickup actuator according to the present invention.
Figure 7B:
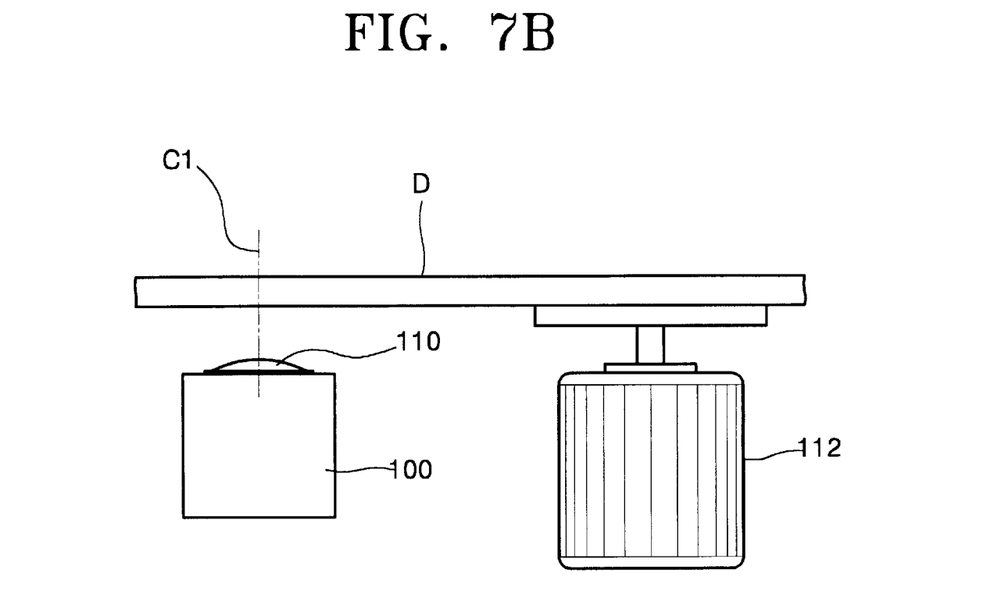
Figure 7C:
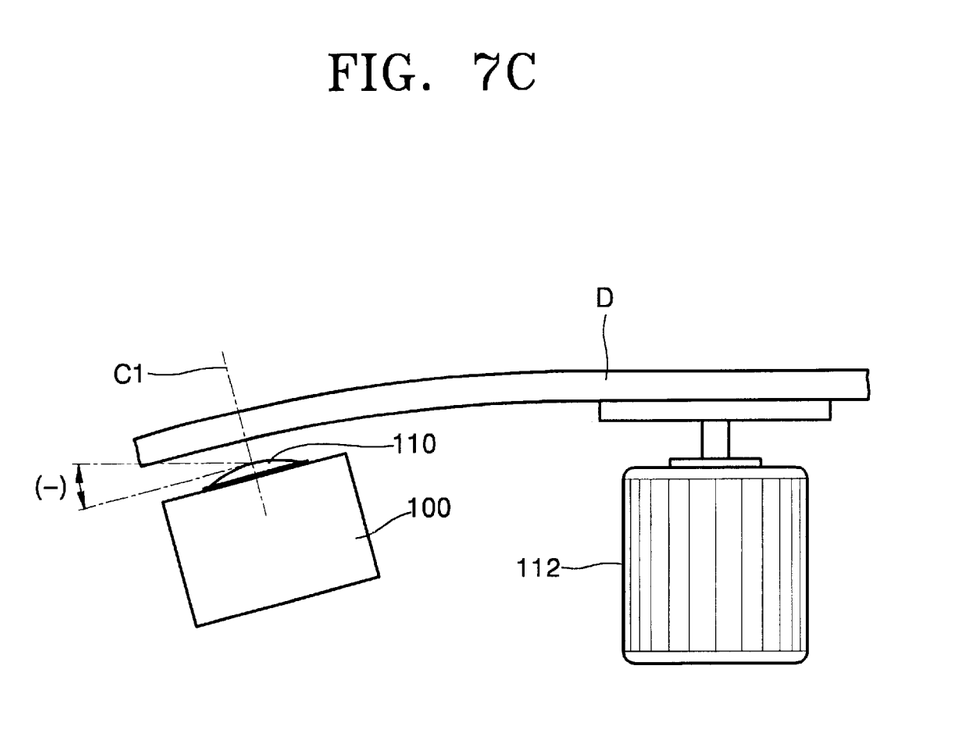

Referring to FIG. 7A, when the disc D curves upward toward an outer perimeter thereof, a (+) direction rolling is achieved while the bobbin 100 moves upward, thereby accurately focusing a light beam passing through the objective lens 110 onto the surface of the disc D. Reference numeral 112 denotes a motor to rotate the disc D. Further, as shown in FIG. 7B, when the disc D is perfectly flat, the bobbin 100 faces upward and a light beam is accurately focused. Moreover, as shown in FIG. 7C, when the disc D curves downward toward the outer perimeter thereof, a (−) direction rolling is achieved while the bobbin 100 moves downward, such that the disc surface is perpendicular to an optical axis C1 of the objective lens 110, and thus a light passing through the objective lens 110 is accurately focused on the surface of the disc D.

The optical pickup actuator offsets the deflection error resulting from a curvature of the disc D during a focusing operation, thereby achieving a proper perpendicular orientation of the optical axis C1 of the objective lens 110 with respect to the surface of the disc D. An optical pickup having the optical pickup actuator is compensatable for the curvature in the disc D such that the light passing through the objective lens 110 is accurately focused on the disc D.

Figure 8:
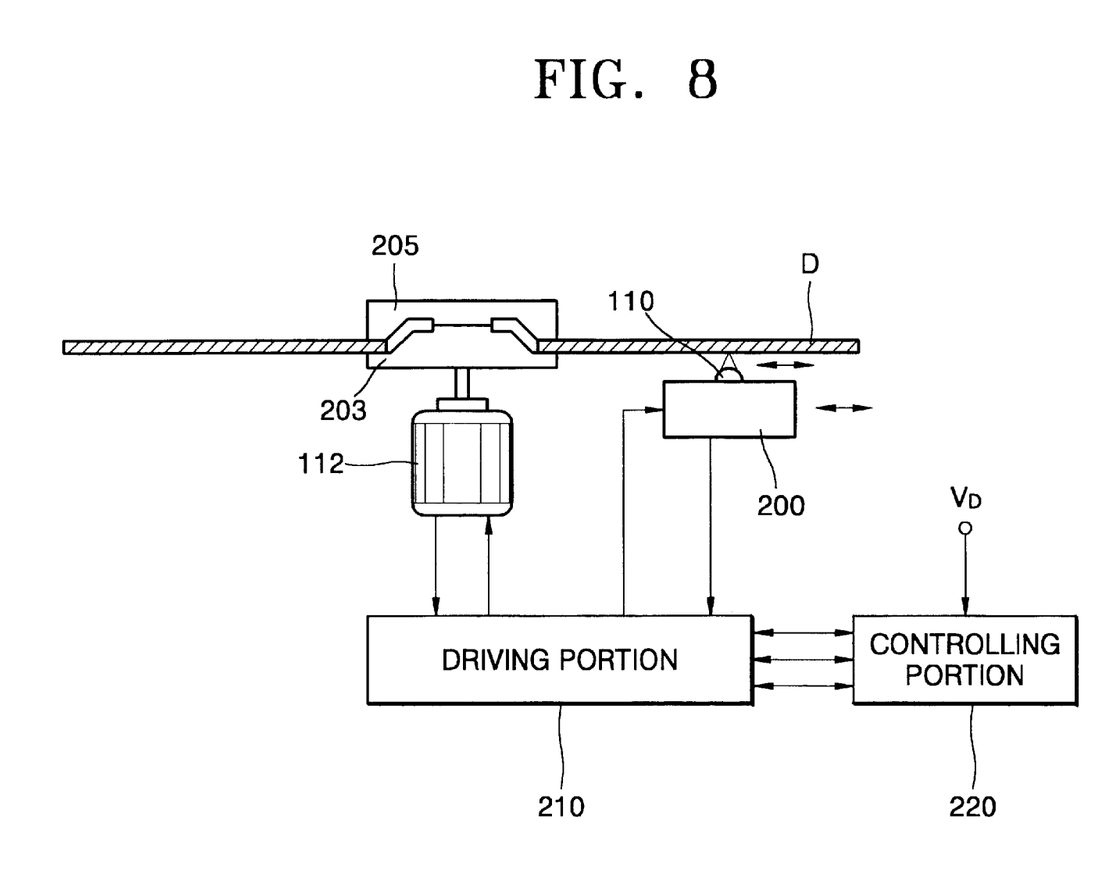
FIG. 8 schematically illustrates an optical recording/reproducing apparatus having an optical pickup employing the optical pickup actuator according to the present invention.

Referring to FIG. 8, an optical recording/reproducing apparatus employing an optical pickup actuated by the optical pickup actuator according to the present invention includes a spindle motor 112 which rotates a disc D, an optical pickup 200 which is disposed in a the radial direction with respect to the disc D and records information on and/or reproduces information from the disc D, a driving portion 210 which drives the spindle motor 112 and the optical pickup 200, and a controlling portion 220 which controls focusing and/or tracking servos of the optical pickup 200. The optical pickup 200 includes an optical system having an objective lens 110, and an actuator which drives the objective lens 110 in focusing and/or tracking directions. Reference numerals 203 and 205 denote a turntable on which the disc D is mounted, and a clamp chucking the disc D, respectively.

Light reflected from the disc D is detected by the optical pickup 200, photoelectrically converted into an electrical signal, and the electrical signal is input into the controlling portion 220 through the driving portion 210. The driving portion 210 controls a rotation speed of the spindle motor 112, amplifies an input signal and drives the optical pickup 200. The controlling portion 220 transmits commands for a focusing servo and a tracking servo that are controlled based on the signal input from the driving portion 210 to the control portion 220 so as to perform focusing and tracking operations of the optical pickup 200.

As shown in FIGS. 5 and 6, in the optical pickup actuator, the holder 160 is positioned at one side of the base 180, and the plurality of elastic supports 170$i$ and 170$h$ connect the bobbin 100 on which the objective lens 110 is mounted to the holder 160, and thus the bobbin 100 is movably supported by the inner and outer elastic supports 170$i$ and 170$h$. The stiffness of the inner elastic supports 170$i$ is different from that of the outer elastic supports 170$h$. The difference in stiffness of the elastic supports is achievable by making at least one of the thickness, the length, and the material of the inner elastic supports 170$i$ different from the outer elastic supports 170$h$. For example, the length of the outer elastic supports 170$h$ may be different from that of the inner elastic supports 170$i$. In particular, the length of the outer elastic supports 170$h$ may be greater than the length of the inner elastic supports 170$i$. Furthermore, the difference in length between the inner elastic supports 170$i$ and the outer elastic supports 170$h$ may be in a range of greater than 0 and less than 3 mm.

The optical pickup actuator further includes the magnetic driving portion which drives the bobbin 100 in the focusing direction A and the tracking direction B. The magnetic driving portion is described in detail above.

As described above, an optical pickup actuator, an optical pickup employing the optical pickup actuator, and an optical recording/reproducing apparatus employing the optical pickup, according to the embodiment of the present invention, produce a rolling in a desired direction during an operation of focusing a bobbin, by the elastic supports on an inner side of the optical pickup actuator being stiffer than the elastic supports on an outer side of the optical pickup actuator, thereby compensating for a curvature of a disc. Among optical pickup actuators according to the embodiment of the present invention, none exhibit the type B radial rolling, more than 90% exhibit the type A radial rolling, and a remainder exhibit the type C radial rolling. Accordingly, recording and reproduction performance with discs exhibiting the curvature is improved, and an overall performance of an optical recording/reproducing apparatus is improved. Further, rolling defects occurring in a manufacture of a conventional optical pickup actuator, and a jitter occurring when using a conventional optical pickup with a curved disc, are reduced according to the embodiment of the present invention. Therefore, a production efficiency is improved and a manufacturing overhead is reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup actuator for use with a disc, comprising:
    a base having a holder;
    a bobbin mounting an objective lens;
    a plurality of elastic supports each having one end coupled to the holder and another end coupled to the bobbin such that the bobbin is movably supported; and
    a magnetic driving portion which drives the bobbin in a focusing direction and/or a tracking direction,
    wherein the plurality of elastic supports comprises inner elastic supports that are positioned on a side of the optical pickup actuator closest to a center of the disc and outer elastic supports that are positioned on an opposite side of the optical pickup actuator closest to an outer perimeter of the disc, and the inner elastic supports and outer elastic supports have different lengths.

2. The actuator of claim 1, wherein the outer elastic supports are longer than the inner elastic supports.

3. The actuator of claim 2, wherein a difference in a length between the outer elastic supports and the inner elastic supports is in a range greater than 0 and less than 3 mm.

4. The actuator of claim 3, wherein the magnetic driving portion comprises:
    first and second magnets positioned opposite to each other at both sides of the bobbin, respectively;
    an external yoke which is installed at the base and fixes the first and second magnets in respective positions;
    an internal yoke which is installed at the base between and opposite to the first and second magnets and guides a movement of the bobbin;
    a focusing coil wound around an outside of the bobbin; and
    tracking coils wound at sidewalls of the bobbin opposite to the first and second magnets.

5. The actuator of claim 2, wherein the magnetic driving portion comprises:
    first and second magnets positioned opposite to each other at both sides of the bobbin;
    an external yoke which is installed at the base and fixes the first and second magnets in respective positions;
    an internal yoke which is installed at the base between and opposite to the first and second magnets and guides a movement of the bobbin;
    a focusing coil wound around an outside of the bobbin; and
    tracking coils wound at sidewalls of the bobbin opposite to the first and second magnets.

6. An optical pickup for use with a disc, comprising:
    an optical system having an objective lens; and
    a pickup actuator to control focusing and tracking servos of the objective lens and to record information on and/or to reproduce information from the disc, wherein the pickup actuator comprises:
    a base having a holder;
    a bobbin mounting the objective lens;
    a plurality of elastic supports each having one end coupled to the holder and another end coupled to the bobbin such that the bobbin is movably supported, the plurality of elastic supports including inner elastic supports that are positioned on a side of the optical pickup actuator closest to a center of the disc and outer elastic supports that are positioned on the opposite side of the optical pickup actuator closest to the outer perimeter of the disc, the inner elastic supports and outer elastic supports having different lengths; and
    a magnetic driving portion which drives the bobbin in a focusing direction and/or a tracking direction.

7. The optical pickup of claim 6, wherein the outer elastic supports are longer than the inner elastic supports.

8. The optical pickup of claim 7, wherein a difference in a length between the outer elastic supports and the inner elastic supports is in a range greater than 0 and less than 3 mm.

9. The optical pickup of claim 8, wherein the magnetic driving portion comprises:

first and second magnets positioned opposite to each other at both sides of the bobbin, respectively;

an external yoke which is installed at the base and fixes the first and second magnets in respective positions;

an internal yoke which is installed at the base between and opposite to the first and second magnets and guides a movement of the bobbin;

a focusing coil wound around an outside of the bobbin; and tracking coils wound at sidewalls of the bobbin opposite to the first and second magnets.

10. The optical pickup of claim 6, wherein the magnetic driving portion comprises:

first and second magnets positioned opposite to each other at both sides of the bobbin, respectively;

an external yoke which is installed at the base and fixes the first and second magnets in respective positions;

an internal yoke which is installed at the base between and opposite to the first and second magnets and guides a movement of the bobbin;

a focusing coil wound around an outside of the bobbin; and tracking coils wound at sidewalls of the bobbin opposite to the first and second magnets.

11. An optical recording/reproducing apparatus comprising a spindle motor which rotates a disc;

an optical pickup which is movably installed in a radial direction with respect to the disc by a pickup actuator;

a driving portion which drives the spindle motor and the optical pickup; and a controlling portion which controls focusing and tracking servos of the optical pickup, wherein the pickup actuator comprises:

a base having a holder;

a bobbin mounting the objective lens;

a plurality of elastic supports each having one end coupled to the holder and another end coupled to the bobbin such that the bobbin is movably supported, the plurality of elastic supports including inner elastic supports that are positioned on a side of the optical pickup actuator closest to a center of the disc and outer elastic supports that are positioned on an opposite side of the optical pickup actuator closest to an outer perimeter of the disc, the inner elastic supports and outer elastic supports having different lengths; and a magnetic driving portion which drives the bobbin in a focusing direction and/or a tracking direction.

12. The optical recording/reproducing apparatus of claim 11, wherein the outer elastic supports are longer than the inner elastic supports.

13. The optical recording/reproducing apparatus of claim 12, wherein a difference in a length between the outer elastic supports and the inner elastic supports is in a range greater than 0 and less than 3 mm.

14. The optical recording/reproducing apparatus of claim 13, wherein the magnetic driving portion comprises:

first and second magnets positioned opposite to each other at both sides of the bobbin, respectively;

an external yoke which is installed at the base and fixes the first and second magnets in respective positions;

an internal yoke which is installed at the base between and opposite to the first and second magnets and guides a movement of the bobbin;

a focusing coil wound around an outside of the bobbin; and tracking coils wound at sidewalls of the bobbin opposite to the first and second magnets.

15. The optical recording/reproducing apparatus of claim 11, wherein the magnetic driving portion comprises:

first and second magnets positioned opposite to each other at both sides of the bobbin, respectively;

an external yoke which is installed at the base and fixes the first and second magnets in respective positions;

an internal yoke which is installed at the base between and opposite to the first and second magnets and guides a movement of the bobbin;

a focusing coil wound around an outside of the bobbin; and tracking coils wound at sidewalls of the bobbin opposite to the first and second magnets.

16. An optical pickup actuator for use with a disc and including a holder, and a bobbin to mount an objective lens, comprising:

a plurality of elastic supports each with one end thereof coupled to the holder and another end thereof coupled to the bobbin such that the bobbin is movably supported; and a magnetic driving portion to drive the bobbin in a focusing direction and/or a tracking direction, wherein the plurality of elastic supports comprises inner elastic supports that are positioned on a side of the optical pickup actuator closest to a center of the disc, and outer elastic supports that are positioned on an opposite side of the optical pickup actuator closest to an outer perimeter of the disc, the inner elastic supports being of a different length, a different thickness and/or formed of a different material from that of the outer elastic supports so that the stiffness of the inner elastic supports is different from that of the outer elastic supports.

17. The actuator of claim 16, wherein the outer elastic supports are longer than the inner elastic supports.

18. The actuator of claim 16, wherein the inner elastic supports are thicker than the outer elastic supports.

19. The actuator of claim 16, wherein the inner elastic supports are formed of a material which is stiffer than that of the outer elastic supports.

20. The actuator of claim 17, wherein a difference in a length between the outer elastic supports and the inner elastic supports is less than 3 mm.

21. The actuator of claim 16, wherein the magnetic driving portion comprises:

first and second magnets positioned at respective opposite sides of the bobbin;

an external yoke sandwiching the first and second magnets to fix the first and second magnets in respective positions;

an internal yoke installed such that each of the first and second magnets is sandwiched between the internal yoke and the external yoke and guides a movement of the bobbin;

a focusing coil wound around an outside of the bobbin; and tracking coils respectively wound at sidewalls of the bobbin facing the first and second magnets.

22. An optical pickup for use with a disc, comprising:

an optical system having an objective lens; and a pickup actuator to control a movement of the objective lens and to record information on and/or to reproduce information from the disc, wherein the pickup actuator comprises:
   a holder;
   a bobbin to mount the objective lens;
   a plurality of elastic supports each with one end thereof coupled to the holder and another end thereof coupled to the bobbin such that the bobbin is movably supported, the plurality of elastic supports comprises
      inner elastic supports that are positioned on a side of the optical pickup actuator closest to a center of the disc, and
      outer elastic supports that are positioned on an opposite side of the optical pickup actuator closest to an outer perimeter of the disc, the inner elastic supports being of a different length, a different thickness and/or formed of a different material from that of the outer elastic supports so that the stiffness of the inner elastic supports is different from that of the outer elastic supports; and
   a magnetic driving portion to drive the bobbin in a focusing direction and/or a tracking direction.

23. The optical pickup of claim 22, wherein the outer elastic supports are longer than the inner elastic supports.

24. The optical pickup of claim 22, wherein the inner elastic supports are thicker than the outer elastic supports.

25. The optical pickup of claim 22, wherein the inner elastic supports are formed of a material which is stiffer than that of the outer elastic supports.

26. The optical pickup of claim 23, wherein a difference in a length between the outer elastic supports and the inner elastic supports is less than 3 mm.

27. The optical pickup of claim 22, wherein the magnetic driving portion comprises:
   first and second magnets positioned at respective opposite sides of the bobbin;
   an external yoke sandwiching the first and second magnets to fix the first and second magnets in respective positions;
   an internal yoke installed such that each of the first and second magnets is sandwiched between the internal yoke and the external yoke and guides a movement of the bobbin;
   a focusing coil wound around an outside of the bobbin; and
   tracking coils respectively wound at sidewalls of the bobbin facing the first and second magnets.

28. An optical recording/reproducing apparatus for use with a disc, comprising:
   a spindle motor which rotates the disc;
   an optical pickup movably disposed in a radial direction with respect to the disc by a pickup actuator;
   a driving portion to drive the spindle motor and the optical pickup; and
   a controlling portion to control a movement of the optical pickup, wherein the pickup actuator comprises:
      a holder;
      a bobbin to mount the objective lens;
      a plurality of elastic supports each with one end thereof coupled to the holder and another end thereof coupled to the bobbin such that the bobbin is movably supported, the plurality of elastic supports comprises
         inner elastic supports that are positioned on a side of the optical pickup actuator closest to a center of the disc, and
         outer elastic supports that are positioned on an opposite side of the optical pickup actuator closest to an outer perimeter of the disc, the inner elastic supports being of a different length, a different thickness and/or formed of a different material from that of the outer elastic supports so that the stiffness of the inner elastic supports is different from that of the outer elastic supports; and
      a magnetic driving portion to drive the bobbin in a focusing direction and/or a tracking direction.

29. The optical pickup of claim 28, wherein the outer elastic supports are longer than the inner elastic supports.

30. The optical recording/reproducing apparatus of claim 28, wherein the inner elastic supports are thicker than the outer elastic supports.

31. The optical recording/reproducing apparatus of claim 28, wherein the inner elastic supports are formed of a material which is stiffer than that of the outer elastic supports.

32. The optical recording/reproducing apparatus of claim 29, wherein a difference in a length between the outer elastic supports and the inner elastic supports is less than 3 mm.

33. The optical recording/reproducing apparatus of claim 28, wherein the magnetic driving portion comprises:
   first and second magnets positioned at respective opposite sides of the bobbin;
   an external yoke sandwiching the first and second magnets to fix the first and second magnets in respective positions;
   an internal yoke installed such that each of the first and second magnets is sandwiched between the internal yoke and the external yoke and guides a movement of the bobbin;
   a focusing coil wound around an outside of the bobbin; and
   tracking coils respectively wound at sidewalls of the bobbin facing the first and second magnets.

* * * * *